(No Model.)
J. A. BARRETT.
AMMETER.
No. 336,688. Patented Feb. 23, 1886.
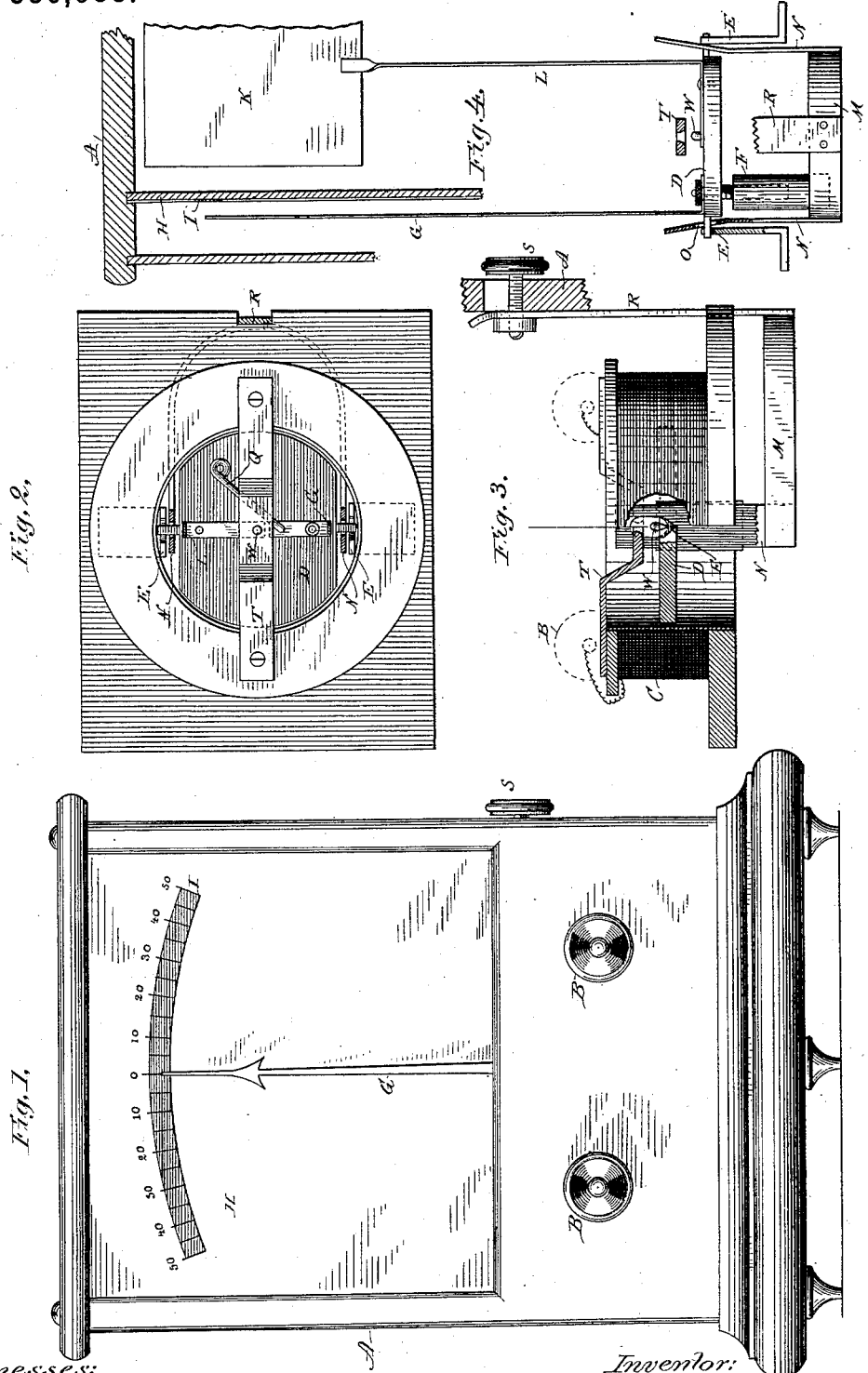
Witnesses:
Ernest Abshagen,
Thos. Toomey
Inventor:
J. A. Barrett,
By his Attorney:

UNITED STATES PATENT OFFICE.

JOHN A. BARRETT, OF BROOKLYN, NEW YORK.

AMMETER.

SPECIFICATION forming part of Letters Patent No. 336,688, dated February 23, 1886.

Application filed February 27, 1885. Serial No. 157,189. (No model.)

*To all whom it may concern:*

Be it known that I, JOHN A. BARRETT, a citizen of the United States, and a resident of Brooklyn, in the county of Kings and State of New York, have invented certain new and useful Improvements in Ammeters, of which the following is a specification.

My invention relates, generally speaking, to galvanometers, but more especially to that particular kind of such instruments known as "ammeters."

The object of my invention is to improve the details of the construction and provide means whereby the pointer or indicator may be quickly brought to rest, and extended or prolonged vibrations prevented, as also to provide improved means for adjusting the instrument, and also for lifting the vibrating parts off their bearings and securing or holding them firmly during transportation of the instrument.

The special feature of construction constituting my invention will be more particularly described in connection with the accompanying drawings, and will then be stated in the claims.

In the drawings, Figure 1 is an elevation of the instrument. Fig. 2 is a plan of the working parts, certain portions being shown in cross-section. Fig. 3 is an elevation and partial section of the coil, vibratory disk or plate included therein, and the devices whereby such disk may be elevated from its bearings when the instrument is not in use. Fig. 4 is an elevation of the working parts, looking in the plane of vibration of the disk and pointer.

A indicates the case of the instrument, and B B the binding-posts, from which connection is made on the interior of the front plate to the coil C of the instrument in any ordinary or suitable manner.

D indicates the vibratory disk or plate, of magnetic material, mounted within the coil, so that it may swing and tend to set itself axially therein when a current passes through the coil C. This disk is made, preferably, of steel, and permanently magnetized, as common in the art, with a polarity that will cause it to tend to set itself at right angles to the plane of the coils when a current passes through the latter. The disk D is supported on the bearings E E, and is provided with a pendulous weight, F, which tends to bring the same quickly to equilibrium after being set in vibration from any cause.

The pointer of the instrument is indicated at G. This pointer works over a scale-plate, H, graduated at I in millampères.

K indicates a thin light plate, of extended area, forming a fan or vane, which is supported by the disk D in any suitable manner, so as to vibrate therewith. Said fan or vane is secured to an arm, L, extending transversely from the plane of the disk, or in a direction substantially parallel with the plane in which the disk vibrates or oscillates. It is advisable to locate the fan or vane, or the operative portion thereof, as far as practicable from the center on which the disk vibrates, so that it may have an extended range of movement under the slight vibrations of the disk, and the latter may, therefore, experience greater opposition to free movement by reason of the opposition to the movement of the fan through the air.

N N indicate two lifting plates or standards having slots or depressions at O, through which the pintles supporting the disk extend, so that when said arms or plates N are elevated the disk will be raised from its bearings E. The arms N are secured to a horizontal yoke or plate, M, which in turn is carried by an upright plate or rod, R, extending upward on the inside of the case, and provided with a lifting-pin, S, which extends through a slot in the case and is constructed as a set nut or screw, so that after the disk has been lifted it may be secured by fixing the nut.

In order to prevent vibration or movement of the disk after it has been lifted, I have provided a cross plate or piece, T, having an opening over a stud or pin, W, upon the disk. When the disk is raised off its bearings E, the pin W enters the perforation or opening in the plate T, and oscillation of the disk on the supports N is thus prevented.

To permit ready adjustment of the instrument, I mount upon the top of the disk a small piece of wire or other material, (indicated at $q$,) one end of which is turned down and enters a perforation at or near the middle portion of the disk, so that the other end of the wire may turn about the first end as a center located on the line of bearing of the disk. By turning the wire or arm $q$ about its center, so as to change the distance of its farther end from the pivotal line of the disk, the desired balance or adjustment may be obtained, after which the wire may be secured in place by a drop of solder.

I do not limit myself to special devices for supporting the fan or vane K, and I wish to be also understood that other means for supporting the lifting-plates N may be employed without departing from the invention.

What I claim as my invention is—

1. In an ammeter or galvanometer, the combination, with the disk, needle, or other device movable under the influence of the electric current, of an arm or standard carrying a fan or vane, whereby prolonged vibration of the parts may be prevented.

2. In an ammeter or galvanometer, a disk, D, having a pendulous weight and provided with a vane or fan located at a considerable distance radially from the center around which the disk vibrates, so as to have an enlarged movement as respects the movement of the disk.

3. In an ammeter or galvanometer, a fan or vane supported on an arm extending from the vibratory parts of the instrument on a line substantially parallel with the plane of vibration.

4. The combination, with the disk or plate, of the cross-bar located above the same, and a pin or lug and opening therefor, one carried by the disk and the other by the cross-bar, whereby the parts may be steadied when the disk is lifted from its bearings.

5. The combination, with the ammeter-disk, of the lifting-pieces N N, arranged beneath the pintles of the disk, and supported by a vertical plate, R, furnished with a set nut or screw passing through the side of the case.

6. The combination, with the lifting-pieces N N, of the yoke M, the plate or rod R, and the set screw or nut, as described.

Signed at New York, in the county of New York and State of New York, this 10th day of February, A. D. 1885.

JOHN A. BARRETT.

Witnesses:
THOS. TOOMEY,
WM. H. BLAIN.